May 5, 1931.  J. B. J. A. VIGNERON  1,803,928
TRAWLING GEAR
Filed Feb. 4, 1928    2 Sheets-Sheet 2
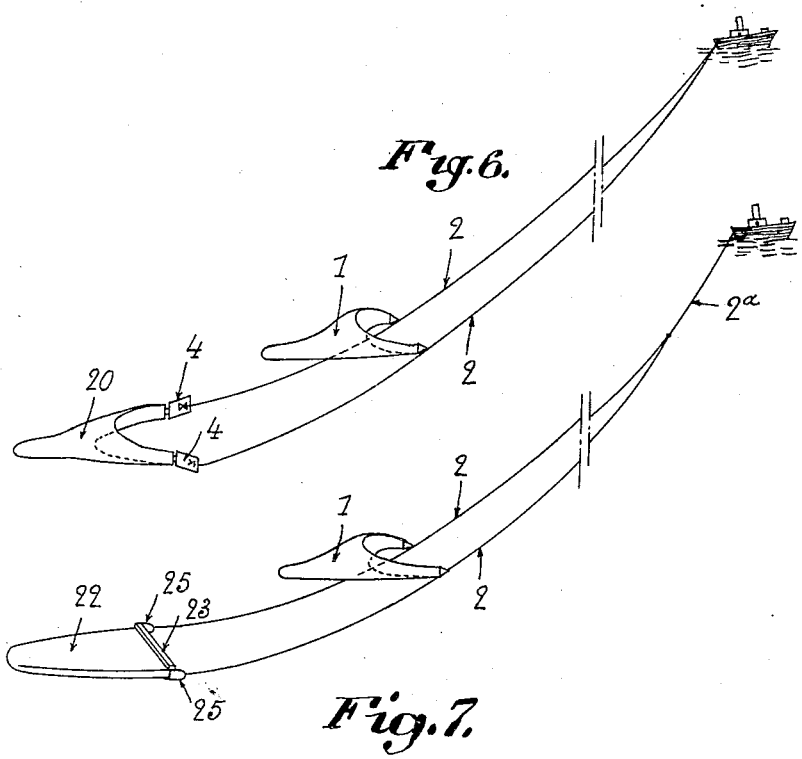
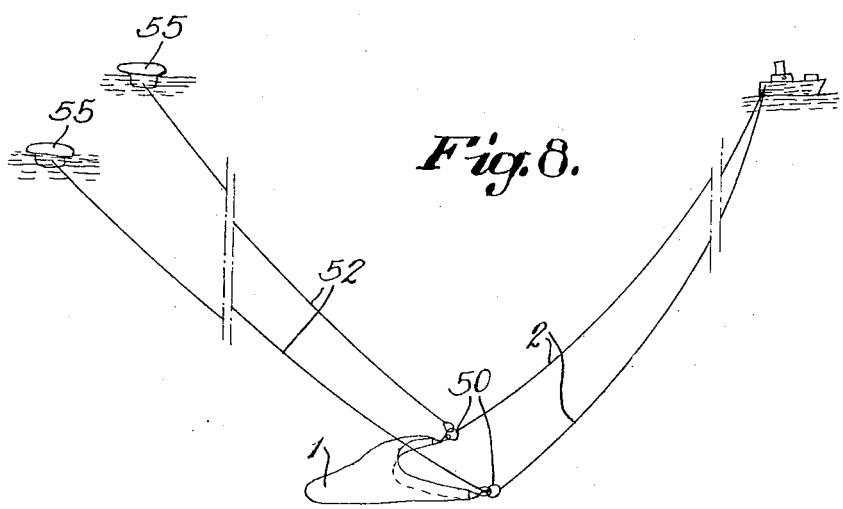
INVENTOR:
Jean-Baptiste Joseph Alphonse Vigneron
BY: Ruegg, Bayer & Bakeler
ATTORNEYS.

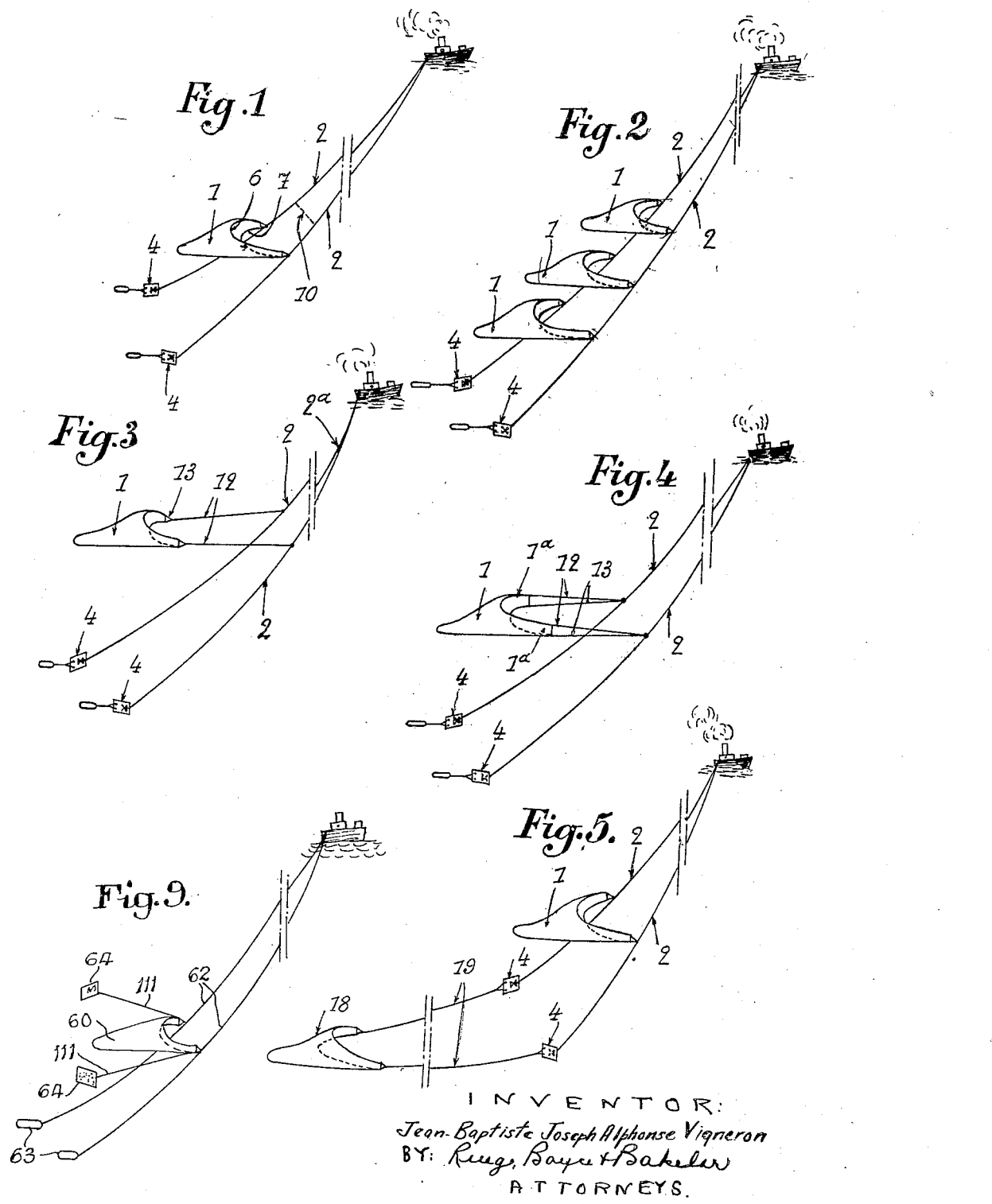

Patented May 5, 1931

1,803,928

UNITED STATES PATENT OFFICE

JEAN BAPTISTE JOSEPH ALPHONSE VIGNERON, OF LA ROCHELLE, FRANCE, ASSIGNOR TO V. D. LTD., OF LONDON, ENGLAND

TRAWLING GEAR

Application filed February 4, 1928, Serial No. 251,954, and in France April 23, 1927.

The invention relates to trawling gears comprising a net which is towed by two hawsers.

In the usual trawling gears, the shear boards which are adapted to provide for the spreading of the net in width are inserted on the hawsers forwardly of the net or are connected to the hawsers so as to be situated forwardly of the net, whereby at each operation of hauling the net on board, the shear boards must be hoisted on board prior to the net itself. These shear boards being very bulky and heavy, the operation is complicated, dangerous and involves a great loss of time.

The invention has chiefly for its object to obviate this drawback and to facilitate the operation of hauling the net on board.

For this purpose, the invention consists in connecting the shear boards or like spreading means for the net to the hawsers, in such manner that these spreading means will be situated rearwardly of the net.

Due to this arrangement, when the net is hauled on board, it comes along the ship before the shear boards whereby the latter need not be hoisted on board and may be left in the water. The troublesome operation of hauling the shear boards on board after each fishing operation, i. e. at frequently repeated periods, is thus eliminated.

Another object of the invention is to increase the fishing power of the trawlers.

It is well known that numerous difficulties are encountered when attempts are made to increase the size of the nets. There is in fact a limit-size for the nets and it appears that such size cannot be readily increased in the present state of the art. It has been found that a net of too large size will be deformed to a much greater extent than a small net and that the manipulation becomes very difficult.

The invention aims to increase the fishing power of the trawlers without increasing the size of the net, and for this purpose it consists in attaching several superposed nets to common hawsers.

It will be understood that this arrangement affords an important saving in material (trawlers, cables, etc.,) and a great saving of time, since in the same operation it is possible to launch several nets into the water or to hoist on board several nets.

Another material advantage of the invention resides in that the nets operate at different heights, which increases the number of the different species of fish which can be captured in a single operation.

It will also be understood that if the nets are attached sufficient near to one another, they provide for a mutual interaction which is quite advantageous for the efficiency of the fishing operation. The uppermost net scares the swimming fish which have always the tendency, when they swim above the ground, to escape towards the ground. In this manner, they naturally come in the path of the next lower net, which increases the efficiency of the capture in said next lower net, and so on unto the lowermost net.

According to another feature of the invention, such lowermost net may be a ground net and the shear boards or the beam of said net may serve at the same time as spreading means for the hawsers.

It has been experienced that such a gear is particularly advantageous since, while fishing on grounds where the fish are abundant, it is however possible to capture at the same time a shoal of migratory fish swimming above the ground.

Figs. 1 to 9 of the accompanying drawings show, by way of example and diagrammatically, several embodiments of the invention.

Referring to Fig. 1, 1 denotes a net attached to hawsers 2 leading from the boat. According to the invention, the hawsers 2 are extended beyond the attaching points of the net and are provided, at their lower ends, with spreading means such as shear boards 4.

Due to this arrangement, the shear boards 4 are located rearwardly of the attaching points of the net 1 to the hawsers, whereby they may be left in the water when hauling the net on board.

In Fig. 1, said shear boards are dragged on the sea bottom and are ballasted to the rear.

In Fig. 3 the net 1, instead of being directly attached to the hawsers 2, is connected therewith by crow foot connections 13 and intermediate cables 12.

In Fig. 4 the net has very large wings 1a respectively connected with the hawsers 2 by two superposed cables 12—13.

In order to prevent an excessive spreading of the hawsers under the effect of the shear boards 4, said hawsers may be connected together below or above the fishing region by a spreading cable 10 (Fig. 1).

In Fig. 9 the ballast members 63 adapted to put the hawsers 62 under the proper tension are distinct from the spreading means or shear boards 64, which latter are connected to the attaching points of the net 60 to the hawsers 62 by cables 111, whereby the shear boards 64 are still located rearwardly of the net.

In Fig. 8 the spreading means for the net in width consist of shear boards associated with floats 55 and connected to the attaching points 50 of the net 1 to the hawsers 2 by cables 52.

In the various embodiments above described, the net 1 may be so arranged as to operate above the sea bottom or close to the ground. In this latter case, it will be necessary to properly ballast the attaching points of the net to the hawsers in order to cause said points to remain in contact with the sea bottom.

As above explained, the fishing power of the trawler may be increased by attaching several nets to the hawsers.

In Fig. 2 three superposed nets 1 are attached at several points of the hawsers 2.

In Fig. 5 the lowermost net 18 is a ground net and is connected to the rear of the shear boards 4 by dragging and scaring cables 19.

In Fig. 6 the ground net 20 is an ottertrawl net wherein the shear boards 4 are directly attached to the ends of the net wings.

In Fig. 7 the ground net 22 is a beam and irons net comprising a beam 23 and skates 25 attached to the hawsers 2.

Obviously, the above described arrangements are given solely by way of example and may be widely modified without departing from the scope of the invention.

Having now described my invention, what I claim as new and desire to secure by Letters Patent is:

1. A trawling gear comprising two towing hawsers, traction means connected to one end of said hawsers, a net connected to said towing hawsers, and means for spreading the net laterally, so connected with said hawsers as to be situated beyond the attaching point of the net upon said hawsers with respect to said traction means.

2. A trawling gear according to claim 1, wherein said spreading means are further adapted to operate as tensioning means for the hawsers.

3. A trawling gear comprising two towing hawsers, traction means connected to one end of said hawsers, a pelagic net connected to said hawsers at an intermediate point of their length and adapted to operate above the ground, and spreading means for said net, so connected with said hawsers as to be situated beyond the attaching point of the net upon said hawsers, and having at least portions adapted to drag on the sea bottom.

4. A trawling gear comprising two towing hawsers, traction means connected to one end of said hawsers, a pelagic net connected to said hawsers at an intermediate point of their length, and adapted to operate above the sea bottom, and spreading means for the net, comprising two shear boards so connected with said hawsers, respectively, as to be situated beyond the attaching point of the net upon the hawsers and adapted to drag on the sea bottom.

In testimony whereof I have signed my name to this specification.

JEAN BAPTISTE JOSEPH ALPHONSE VIGNERON.